(12) United States Patent
Dawson et al.

(10) Patent No.: US 7,076,237 B2
(45) Date of Patent: Jul. 11, 2006

(54) TRAFFIC SHAPING OF CELLULAR SERVICE CONSUMPTION THROUGH DELAYING OF SERVICE COMPLETION ACCORDING TO GEOGRAPHICAL-BASED PRICING ADVANTAGES

(75) Inventors: Christopher James Dawson, Arlington, VA (US); Rick Allen Hamilton, II, Charlottesville, VA (US); James Wesley Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 10/912,487

(22) Filed: Aug. 5, 2004

(65) Prior Publication Data
US 2006/0040641 A1 Feb. 23, 2006

Related U.S. Application Data

(63) Continuation-in-part of application No. 10/912,478, filed on Aug. 5, 2004.

(51) Int. Cl.
H00M 11/00 (2006.01)
(52) U.S. Cl. ............... 455/405; 455/406; 455/408; 455/414.1; 705/30; 705/32; 379/114.9; 379/114.12; 379/114.13
(58) Field of Classification Search ........... 455/405, 455/406, 414.1–4, 408, 419, 432.1, 466, 455/435.1–3; 705/30, 32, 34; 379/114.6, 379/133.134, 114.7, 114.12, 114.13, 114.9, 379/114.8, 114.03
See application file for complete search history.

(56) References Cited

U.S. PATENT DOCUMENTS

| 5,526,403 | A | 6/1996 | Tam .......................... 379/59 |
| 5,535,274 | A | 7/1996 | Braitberg et al. ........... 379/446 |
| 5,602,900 | A | 2/1997 | Hattori et al. ................ 379/58 |
| 5,678,200 | A | 10/1997 | Levi ............................ 455/88 |
| 5,835,785 | A | 11/1998 | Overtoom et al. .......... 395/834 |
| 5,937,334 | A | 8/1999 | Peterson et al. ........... 455/74.1 |
| 6,028,537 | A | 2/2000 | Suman et al. ............... 340/988 |
| 6,122,531 | A | 9/2000 | Nicholls et al. ............ 455/570 |
| 6,131,042 | A | 10/2000 | Lee et al. .................... 455/556 |
| 6,212,273 | B1 | 4/2001 | Hemkumar et al. ........ 379/410 |
| 6,289,382 | B1 | 9/2001 | Bowman-Amuah ......... 709/226 |

(Continued)

FOREIGN PATENT DOCUMENTS

JP 2002-109396 * 4/2002

*Primary Examiner*—Charles Appiah
*Assistant Examiner*—Khawar Iqnal
(74) *Attorney, Agent, or Firm*—Robert H. Frantz; David A. Mims, Jr.

(57) ABSTRACT

Changes in user behavior of usage of wireless services from a mobile device are encouraged in order to effect shaping of traffic and utilization patterns among a plurality of cells within a rate plan region, wherein a discount indicator disposed in said mobile device is provided to notify a user of a discount available for consuming wireless service from a given cell. A geo-cost policy is established for that user or mobile device in which rules and conditions according to the available discounts and class of service are defined. A service completer queues services and automatically completes queued services upon present conditions meeting said geo-cost policy rules, such as delaying and later delivering messages when the mobile device is relocated to a cell where discounts are being offered.

24 Claims, 15 Drawing Sheets

U.S. PATENT DOCUMENTS

| | | | |
|---|---|---|---|
| 6,377,825 B1 | 4/2002 | Kennedy et al. | 455/569 |
| 6,434,364 B1* | 8/2002 | O'Riordain | 455/67.11 |
| 6,526,272 B1* | 2/2003 | Bansal et al. | 455/406 |
| 6,775,552 B1* | 8/2004 | Link, II | 455/456.1 |
| 2002/0072369 A1* | 6/2002 | Sasada et al. | 455/435 |
| 2002/0101968 A1* | 8/2002 | Sano | 379/114.12 |
| 2002/0120540 A1* | 8/2002 | Kende et al. | 705/35 |
| 2003/0076816 A1* | 4/2003 | Naranjo et al. | 370/352 |
| 2004/0030620 A1* | 2/2004 | Benjamin et al. | 705/32 |
| 2004/0198380 A1* | 10/2004 | Unmehopa | 455/456.1 |
| 2005/0009499 A1* | 1/2005 | Koster | 455/406 |
| 2005/0181758 A1* | 8/2005 | Ansamaa | 455/406 |
| 2006/0019631 A1* | 1/2006 | Hutcheson et al. | 455/406 |

* cited by examiner

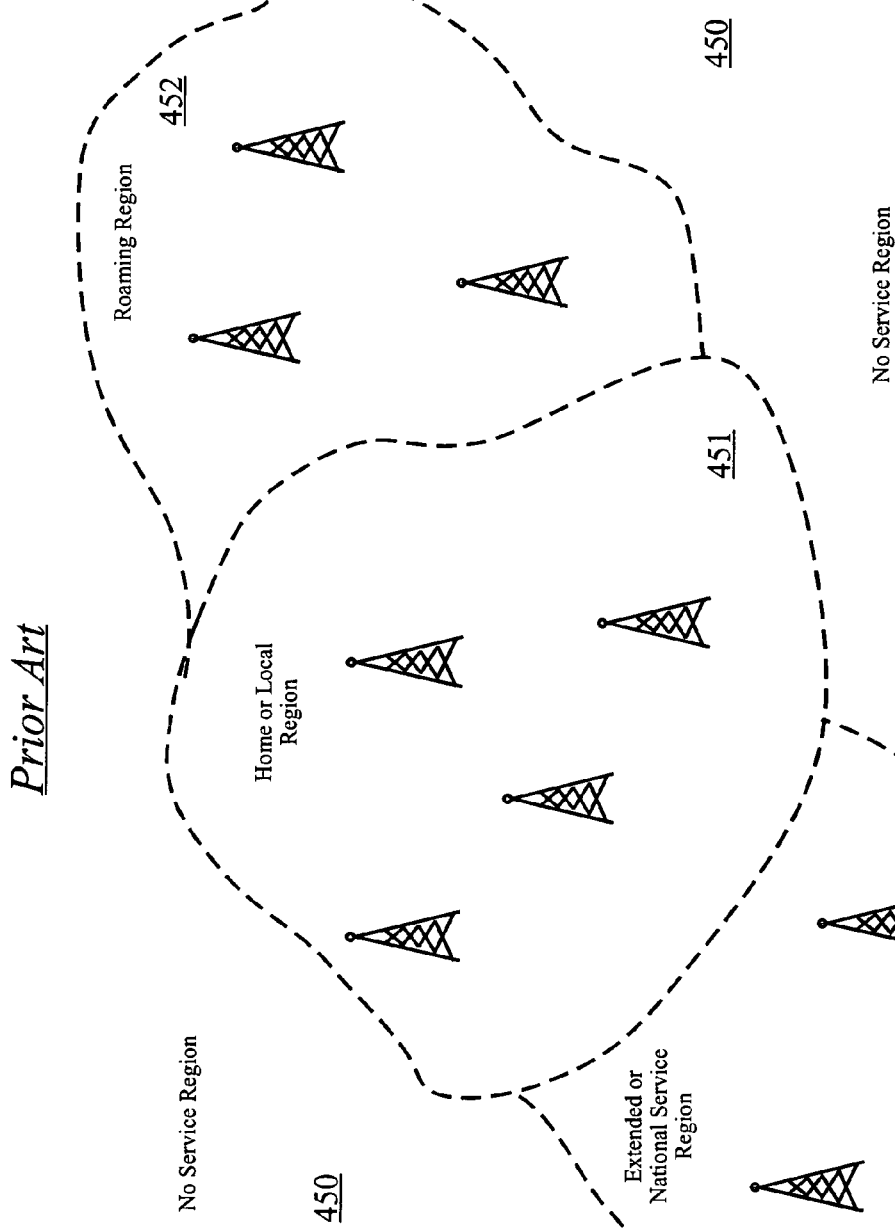

*Prior Art*

Monthly Rate Plan (Max. Minutes Per Month
and Cents per Minute over Max.)

~50

| Region | Type | Day | Night | Weekend | Anytime |
|---|---|---|---|---|---|
| 51 | 52 | 53 | 54 | 55 | 56 |
| Local | Voice | LV-Day | LV-Night | LV-Wkend | LV-Anytime |
| | Data | LD-Day | LD-Night | LD-Wkend | LD-Anytime |
| | Pic/Video | LP-Day | LP-Night | ... | ... |
| | Text Msg. | LM-Day | ... | | |
| | Web | LW-Day | | | |
| Extended | Voice | XV-Day | XV-Night | ... | ... |
| | Data | XD-Day | XD-Night | | |
| | Pic/Video | XP-Day | XP-Night | | |
| | Text Msg. | ... | ... | | XW-Anytime |
| | Web | | | | |
| Roaming | Voice | RV-Day | RV-Night | ... | ... |
| | Data | RD-Day | RD-Night | | |
| | Pic/Video | ... | ... | | |
| | Text Msg. | | | | RW-Anytime |
| | Web | | | | |

Figure 5

Monthly Rate Plan
(Max. Minutes/Cents per Minute over Max)

| Region | Type | Day | Night | Weekend | Anytime |
|---|---|---|---|---|---|
| 51 | 52 | 53 | 54 | 55 | 56 |
| Local | Voice | LV-Day | LV-Night | LV-Wkend | LV-Anytime |
| | Data | LD-Day | LD-Night | LD-Wkend | LD-Anytime |
| | Pic/Video | LP-Day | LP-Night | ... | ... |
| | Text Msg. | LM-Day | ... | | |
| | Web | LW-Day | | | |
| Extended | Voice | XV-Day | XV-Night | ... | ... |
| | Data | XD-Day | XD-Night | | |
| | Pic/Video | XP-Day | XP-Night | | |
| | Text Msg. | ... | ... | | XW-Anytime |
| | Web | | | | |
| Roaming | Voice | RV-Day | RV-Night | ... | ... |
| | Data | RD-Day | RD-Night | | |
| | Pic/Video | ... | ... | | |
| | Text Msg. | | | | RW-Anytime |
| | Web | | | | |

50

Shaping Rules (Discount)

1050

| | ≤1.2 | 1.2-1.6 | >1.6 |
|---|---|---|---|
| | -0% | -40% | -60% |
| | -0% | -40% | -60% |
| | ... | ... | ... |
| | ... | ... | ... |
| | -0% | -40% | -60% |
| | ... | ... | ... |
| | -0% | -40% | -60% |

Figure 12

TRAFFIC SHAPING OF CELLULAR SERVICE CONSUMPTION THROUGH DELAYING OF SERVICE COMPLETION ACCORDING TO GEOGRAPHICAL-BASED PRICING ADVANTAGES

CROSS-REFERENCE TO RELATED APPLICATIONS

This patent application is a Continuation-in-Part of U.S. patent application Ser. No. 10/912,478, filed on Aug. 5, 2004, by Christopher J. Dawson, et al., which is commonly assigned with the present patent application.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

Related U.S. patent application Ser. No. 10/912,478, filed on Aug. 05, 2004, by Christopher J. Dawson, et al., is hereby incorporated by reference in its entirety, including figures.

BACKGROUND OF THE INVENTION

This patent application is a Continuation-in-Part of U.S. patent application Ser. No. 10/912,478, filed on Aug. 5, 2004, by Christopher J. Dawson, et al., which is now pending.

1. Field of the Invention

This invention relates to technologies and business processes for dynamic cellular phone rate pricing based on cellular traffic patterns, and especially to methods and systems which encourage consumer behavior changes which optimize loading of equipment and return on investment for cellular infrastructure.

2. Description of the Related Art

Millions of people around the world use cellular phones as a means to connect talk with one another and to access to various sources of information. With a cellular telephone, users are able to use an incredible array of features and functions such as storing contact information, making to-do task lists, sending or receiving text or voice messages and being able to connect to the Internet.

Regardless of the makes and models of cellular phones being supplied to the marketplace, cellular phone companies actively offer different rate plans to attract and retain new and existing customers. Various rate plans include, but are not limited to, prepaid, area-limited and either one or two-tiers of time-based services such as "peak," "off-peak," and "nights and weekends." The last being the most commonly used in today's marketplace.

A cell phone is actually a sophisticated radio that functions along with cell phone towers. The battery-powered, portable devices which perform wireless networking for voice and/or data communications as all or part of their functionality are well known in the art, including but not limited to:

(a) cellular telephones;
(b) wireless web browsers;
(c) cordless telephones and cordless small office/home office (SOHO) telephone switch systems;
(d) laptop computers, palm top computers and personal digital assistants (PDA) equipped with wireless local area network (LAN) or cellular data interface cards; and
(e) one-way, two-way, text and voice pagers and terminal devices.

For the remainder of this description, we will refer primarily to cellular telephone examples and implementations to be representative of a range of these devices. Certain terms from cellular telephone parlance are analogous in functionality to terms from other networking technologies, such as Personal Communications Systems ("PCS") towers being similar to "base stations" or wireless access points. It will be readily recognized by those skilled in the art, however, that the problems and the invention presented herein are common to all the various wireless network battery-powered devices as previously exemplified.

A key aspect of each cellular system is the division of a service area into small "cells", each cell being served by a single tower, access point or base station. Turning to FIG. 1, two "cells" (10, 11) are shown geographically adjacent to each other, each cell having a "tower" (12, 13) located at its center. Typically, cells are considered to be of hexagonal shapes (15, 17) for network planning and management purposes in PCS architecture, but in reality, the signals from the towers propagate equally well for a generally circular area (14, 16) of coverage. This often produces areas of coverage overlap (18) between adjacent cells. In practice, a cellular system (19) comprises multiple cells in a honeycomb arrangement, but only two adjacent cells are shown here for ease of understanding.

When a terminal device such as a PCS handset or wireless web browser is at a position $P_1$ outside of reception range (14, 16) of a tower within the system, the device will be unable to perform its functions such as making or receiving telephone calls, performing data communications, receiving text messages, etc. Most systems will continuously "search" for a tower signal, performing some type of protocol to make contact with one or more towers which may be within reception range.

This process of searching may simply include measuring a signal strength on a frequency and/or channel from the tower, or may be more active such as sending or transmitting a signal from the device's transmitter to initiate a contact with an in-range tower. While the former approach will consume some power for the search, the latter almost always consumes even more power as transmission of signals is usually a more power intensive operation than simply receiving a signal.

As a device reaches or travels to a position $P_2$ in the "fringe" area of coverage for a tower, it may detect a usable signal strength from the tower (12) within its reception range, and/or may be able to effectively transmit a code, registration or other signal to the tower (12). At this position, the device is technically within the tower's cell (10).

The "logging in" or "registration" process as a device enters a tower's cell varies between different wireless technologies. For example, the registration process employed by PCS systems is different than the registration process used by its predecessor "analog" (e.g. "AMPS") cellular system, and both are very different than the registration process employed by wireless data networking technologies such as BlueTooth, IEEE 802.11b, Motorola's Ricochet network, two-way pager networks, etc. For illustrative purposes, however, we now present a brief overview of the PCS registration process.

Cell phones and base stations use low-power transmitters, so that the same frequencies can be reused in non-adjacent cells which allows millions of people to use cell phones simultaneously. Each city comprises, for example, of hundreds of towers while each carrier in each city runs one central office called Mobile Telephone Switching Office ("MTSO"), which handles all of the phone connections to the normal land-based phone system and controls all of the base stations in the region. A cell phone is composed of three unique codes that help carriers identify each gadget and facilitate call transmission. Each cell phone has its unique 32-bit number programmed into the phone when it is manufactured called Electronic Serial Number ("ESN"). Once service is activated, the cell phone will have the 10-digit phone number called the Mobile Identification Number ("MIN") and an unique 5-digit number that assigns to each carrier (e.g. Spring, MCI, AT&T, Verizon, etc.) by the Federal Communications Commission ("FCC") called the System Indentication Code ("SID") programmed.

When a cell phone is first powered up, it "listens" for an SID on the control channel. The phone and base station uses the control channel, a predetermined special frequency, to talk to one another about things like call set-up and channel changing. If the phone cannot find any control channel to listen to, then it knows that it is out of range and displays a "No Service" indicator or "Out of Range" message. When the phone receives the SID, it compares it to the SID programmed into the phone. If authentication is successful, then the phone is communicating with its home system. The phone transmits a registration request along with the SID, which is received by one or more towers within range while the MTSO keeps track of your phone's location in a database. For example, in FIG. 1, if the handset is in position $P_2$, only one tower (12) may receive the registration request. If the handset is in position $P_4$, however, when it is powered ON initially, it may be within the overlap of multiple cells, and the registration request may be received by multiple towers (12, 13), or may be directed to the tower for which the strongest signal strength is detected.

This allows the MTSO to know which cell grid the user is currently in so it knows when to ring the phone. When the MTSO receives a call, it searches the database to see which cell the user is in. The MTSO selects a frequency pair that the phone will use in the cell grid to take the call. By using the control channel, the MTSO communicates with the phone to inform which frequencies to use. Once the user's phone switches on those frequencies, the call will be connected.

Many wireless networked systems are designed to handle providing continuous service as a unit travels from one cell to another, while other technologies do not provide this functionality. For example, a PCS telephone is expected to be used in a moving vehicle or while walking, and as such, the PCS system specifications and design include protocols and schemes for "hand off" of service to a handset from one cell tower to another. So, for example, as a handset moves from position $P_3$ to position $P_4$, and then to position $P_5$, the handset may initially be served by a first tower (12), and then be handed off to another tower (13) according to signal strength criteria and channel availability in each area of coverage (14, 15).

The cellular base station constantly notes a user's signal strength is diminishing as the user moves toward the edge of the base cell grid. At the same time, the base station in the cell the user is moving toward is aware of the increasing phone signal strength by listening and measuring signal strength on all frequencies. Then, the two base stations coordinates with each other through the MTSO, and at some point, your phone gets a signal via control channel to change frequencies. This hand off switches the user's phone to the new cell. If the SID on the control channel does not match the SID programmed on the mobile device, then the phone knows that it is roaming. The local MTSO of the cell where the user is roaming will contact the MTSO of the home system to verify its database that the phone's SID is valid. Once verification occurs, the local MTSO will track roaming usage as the phone moves through its cell.

Turning to FIG. 2, a larger portion of a cellular network (24) is illustrated, to show how a terminal or handset may traverse multiple positions $P_1$, $P_2$, $P_3$, $P_4$, $P_5$, $P_6$, $P_7$, and $P_8$, starting outside a network, entering the fringe of the network, passing through and being served by multiple cells (20, 21), and finally passing through the fringe and out of the network. Certain cells (23, 22) may never provide service to the handset based upon its position and proximity to other, closer towers.

Turning to FIG. 3, a generalized architecture (40) of these types of hardware platforms is depicted. Although each actual device available on the market may vary in detail from this depiction, the general functionality and capabilities of each platform fit within the general view of this figure. Each system typically includes all or some of the following functions:

(41) a microprocessor, microcontroller, or control logic for implementing the logical processes of the unit;

(42) one or more application specific integrated circuits ("ASIC") for voice compression, decompression, protocols, error checking/correction, security, encryption/decryption, and radio signal modulation/demodulation;

(43) an audio microphone and speaker or earphone for audible interfacing with the user;

(44) a radio frequency ("RF") frontend including intermediate frequency stages, and an antenna (45) for receiving and transmitting RF signals (401) from and to a tower, base station, or wireless access point (404);

(46) one or more memory devices and types including some or all of Random Access Memory, FLASH Read Only Memory, battery-backed memory, and Read Only Memory, with one or more memory expansion slots (47) in some cases;

(48) a display such as a liquid crystal display ("LCD"), color TFT, or cathode ray tube ("CRT") display, often coupled with a touch screen sensor for receiving user input and selections, typically provided with a keypad or keyboard or other special buttons for receiving user input and selections;

(49) often several external I/O connectors for battery chargers, external speakers and microphones, expansion keyboards and displays;

(400) often additional data interfaces such as IrDA or PCMCIA slots for receiving add-on hardware, interfaces, program packs, or software; and (403) a clock, timer and/or calendar for keeping time in units such as seconds, minutes, hours, days, months and years.

More advanced wireless network devices may include a location technology in detail such as a GPS receiver or E911 capability (402).

As mentioned before, carriers offer a wide range of cellular rate plans to users. Most services providers offer three different levels of coverage such as local, regional and national, generally illustrated in FIG. 4. Local coverage (451) usually limits service area to a particular metropolitan area. The plan typically provides more minutes per month than other coverage plans for local call, and calls in extended (453) areas may be higher. Calls originated from a roaming (452) area may incur charges from other carriers, as well. Other regions (450) may not have coverage at all.

Some carriers now offer unlimited local airtime to lure customers. Many recoup their costs by charging more per minute for roaming and by tacking on a per-minute airtime charge for calls made outside the local area.

Regional coverage enlarges the service area to include the entire state as well as selected surrounding ones. For example, local coverage in a southeastern U.S. plan might include Alabama, Arkansas, Florida, Georgia, Kentucky, Louisiana, Mississippi, North Carolina, South Carolina, Virginia and Tennessee. Calls within and between any of these states don't have any associated roaming and long distance charges. These plans cost more and also give you fewer airtime minutes per month than similarly priced local plans. In addition, if one uses more minutes than provided within the plan, a surcharge will apply for extra usage.

National coverage (453) is often a flat-rate national plan, that is available anywhere in the United States where the carrier offers service with no roaming or long distance charges. Most carriers reach close to 95 percent of the United States with a combination of analog and digital service. National plans offer even less airtime per month than regional plans and are usually the most expensive option.

The very popular service plan most consumers use today is the fixed monthly rate pricing that buys a certain number of airtime minutes for both peak and off-peak hours and other extra features for add-on such as text messaging, call waiting and Internet browsing. After a customer passes a credit check, carriers usually recommend signing a contract for a certain period of time from eleven months to three years. The carrier, in return, offers free or steeply discounted phones, accessories and even pricing plans for the duration. Like any other contract with its provisions, should the user decide to cancel before the term of the contract, a steep penalty charge is incurred.

Turning to FIG. 5, a typical monthly rate plan is shown in table form. The rate table (50) includes a number of "types" of services, such as minutes of voice usage in the local calling area, in the rows (51). The pricing or allowed consumption varies based on several characteristics such as the coverage area (51), type of service (52), number of minutes included based on minute types such as daytime (53), nighttime (54), weekend (55) or anytime (56). So, for each entry in the table, a carrier may define a maximum number of minutes included in the rate plan, and may define a surcharge for each minute of that type of service over the prepaid amount in a period of time such as a month.

For example, at $39.99 a month, hypothetically call "MetroTalker", consumer can have the standard local voice 3000 minutes which consists of 500 daytime minutes (LV-Day) from 7 AM to 7 PM on weekdays, 2000 nights (LV-Night) after 7 PM on weekdays, 500 weekends (LV-Weekend) and zero anytime (LV-Anytime) minutes. For any additional minutes use, depending on time period, a surcharge is incurred on a per minute basis. For example, day overage charge may be 14 cents per minute, and night or weekend overcharge may be 8 cents per minute. So, the entries in the table (50) for this rate plan "MetroTalker" would be:

LV-Day=(500, 14)
LV-Night=(2000, 8)
LV-Weekend=(500, 8)
LV-Anytime=(0, 0)

Similarly, extended area and roaming minute maximums and overcharges can be defined for voice services, as well as defined for other types of calls (e.g. data, pictures, text messaging, web browsing).

It is important to note, however, that these rate plans take into account the time of day and week of the service usage (e.g. night vs. day, weekend vs. weekday), the type of usage (e.g. voice, data, browsing, etc.), and the service region or area from which the call originates, wherein each region or area contains multiple cells (e.g. multiple towers).

Turning to FIG. 6, a generalization of the present-day billing reconciliation process (60) is shown. The mobile device (61) makes a call through a tower (62), and its service usage data is recorded by a base station (63). The base station (63), also captures the time and day of the usage (64). The base station is not aware of specific rate plans the mobile device is assigned because it can be a MTSO of another carrier.

Usage records (65, 65') are transferred to a billing server (66) for accounting processing. The billing server consolidates the usage records, verifies them against rate plans (68) and gathers customer profile information (67) to generate customer monthly invoice (69). The billing plan is either time-based or rate plan based.

It is important to note, again, that the invoice to the customer contains calculations and charges based upon the minutes of service used during a billing cycle, when those minutes were used (e.g. time, day of week), and the region from which the service originated or was consumed (e.g. home, extended, roaming, etc.). There is no calculation of the charges due to the customer based upon any other factors typically.

As such, cellular phone carriers offer fixed rate plans which do not take into account the geographically based costs associated with cellular services within regions of service. Geographic costs associated with cellular telephone usage include the cost of land lease, towers, switches, and other associated processing equipment, the human costs of cellular company employees, and the costs associated with service levels.

For example, consider a local region that has 67 towers or 67 cells in it. Each of those towers has its own set of costs: cost of leasing the land on which the tower is placed, cost of operating and maintaining the equipment in the tower and base station, etc. Some towers are owned by the service provider, while others are leased from other owners.

For instance, in a low usage cell, underutilized equipment is a cost, and inversely, in an overly busy area, excessive usage may drive the need for additional bandwidth. Similarly, newer towers may be more costly than older, depreciated towers. But, the fees collected from the users for using these different towers or cells within a rate region are the same. For example, let's assume a prepaid cellular plan provides for debiting a user's account balance at the rate of 9 cents per minute for calls made from home region. Also assume, again, that there are 67 towers in the home region. Further assume that cell #19 is the newest cell, and has a cost of operation of 15 cents per minute, and that cell #45 is the oldest cell and has a cost of operation of 2 cents per minute.

If the user makes a call from cell #19, the revenue from the call is 9 cents per minute, even though the cost to operate the cell is 15 cents per minute. So, calls handled by this cell under this rate plan actually lose 6 cents per minute. However, calls originating from cell #45 produce a positive revenue of 7 cents per minute.

To be profitable, the sum total of all of the cellular operational costs in a calling region must not exceed the sum total of the revenue from service consumed by all users on all rate plans within that region.

Often times, though, the newer and more expensive to operate cells are also the most heavily used. Consider a growing metropolitan area in which a downtown area is experiencing a business boom. This means that more towers will be needed in the downtown area. But, these new towers fall within the existing "local" region of rate plans, and as such, the revenue from their usage will be the same as that from the existing towers in the local region. Thus, to meet increasing demand and traffic, carriers are often forced to install new equipment, which often results in a negative revenue generation.

Carriers currently have no means for redirecting calls and services from a higher cost cell to a lower cost cell, especially for cells within the same rate region. Therefore, there exists a need in the art for a method which utilizes service consumption to modify consumer behavior encouraged by geographical-based pricing advantages related to cellular operational characteristics within a rate plan region.

It would be difficult to publish a map of cells within regions to users, especially considering the overlap of coverage between adjacent cells. Radio range coverage not only varies based upon geographical conditions (e.g. hill sides, buildings, etc.), but also upon varying weather conditions.

Additionally, rate plans are already complicated and many consumers complain about their inability to understand the pricing schemes already employed. Publishing a rate plan which breaks the fees into cells within regions would further exasperate this problem.

Further, publishing rate plans and brochures is costly, and therefore is only performed periodically by cell phone companies. However, changes to usage and costs of individual cells is relatively dynamic. It would not be practical, however, to publish a new rate plan brochure or guide daily or weekly in order to update costs of usage by cell.

In some jurisdictions, rate plans must be approved by a regulatory body or agency, which can be costly, timely and laborious to update. For this reason as well, dynamically changing a rate plan is not desirable.

Therefore, there additionally exists a need in the art for a new system and method for adapting service usage among multiple cells within a rate plan region without requiring new rate plans to be published, documented, authorized, approved, comprehended or adopted.

The invention described in the related patent application, which is incorporated herein, allows wireless service providers to selectively enhance the utilization of cell towers through consumer behavior modification based on dynamically generated market incentives. This invention allows wireless service providers to use dynamic pricing and discounts correlated to specific cells in which the consumer wishes to use service as a mechanism, in a more effective manner, to affect individual cell tower usage.

According to one aspect of the present invention, pricing models become more dynamic in response to with real-time usage data. Rather than using the traditional area coverage rate plan, or in addition to a traditional area-based plan, a graduated stand-alone or graduated comparative pricing model is introduced by the invention, in which the users are shown in real-time dynamically generated pricing and cost incentives to delay usage in high-traffic or high-cost-of-operation cells, and to encourage usage in low-traffic or low-cost-of-operation cells.

Consumers may learn patterns of discounts and market incentives, and will adjust their behavior accordingly, thereby affecting desirable traffic load changes among cells within a rate plan region without the need for publishing complicated maps, committing to contractual discounts, and educating the users with respect to technology complications and details.

It is also desirable, in view of the discount and incentives provided by the related invention, to allow a user to establish a set of preferences under which certain activities on the mobile device could be completed while in the higher cost cell, but for which the actual network servicing of the operation would be delayed until the mobile device reaches a lower cost cell where the incentives are being offered to the consumer. By delaying service completion but allowing the user to perform certain actions in the higher cost cell, the user is able to queue certain services to occur while he or she is mindful of it, but the completion of which will be made in a lower cost cell, thereby providing maximum convenience and cost advantage to the user.

Therefore, there also exists a need in the art for a system and method which allows a user to establish a set of service delaying preferences, to provide certain preliminary actions by the user to initiate a delayed service, and then to automatically complete that service when the mobile unit has reached a lower cost cell or under other circumstances defined by the user's preferences.

BRIEF DESCRIPTION OF THE DRAWINGS

The following detailed description when taken in conjunction with the figures presented herein present a complete description of the present invention.

FIG. 4 describes the typical three different regions of coverage.

FIG. 5 shows a typical monthly rate plan pricing table.

FIG. 12 illustrates another aspect of the present invention, Graduated/Comparative Discount Profile.

SUMMARY OF THE INVENTION

Figure 1:
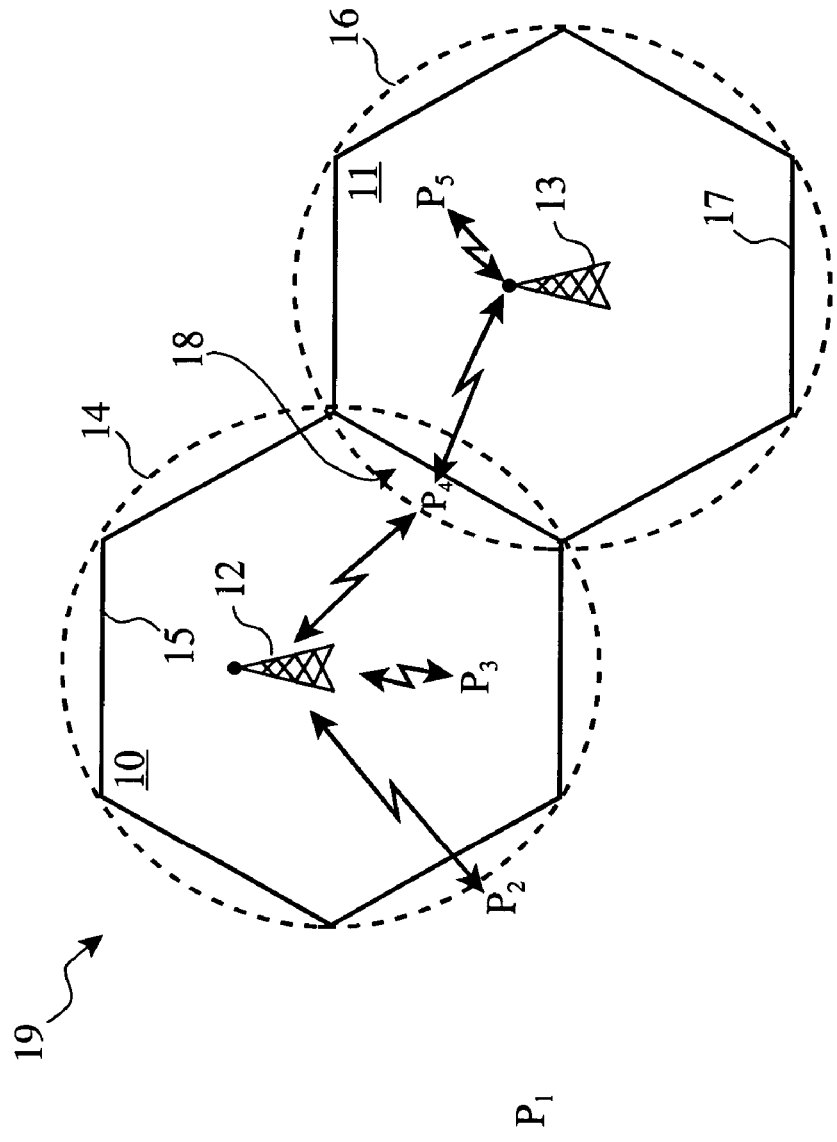
FIG. 1 depicts the architecture of the cellular telephone system including multiple small cells.
Figure 2:
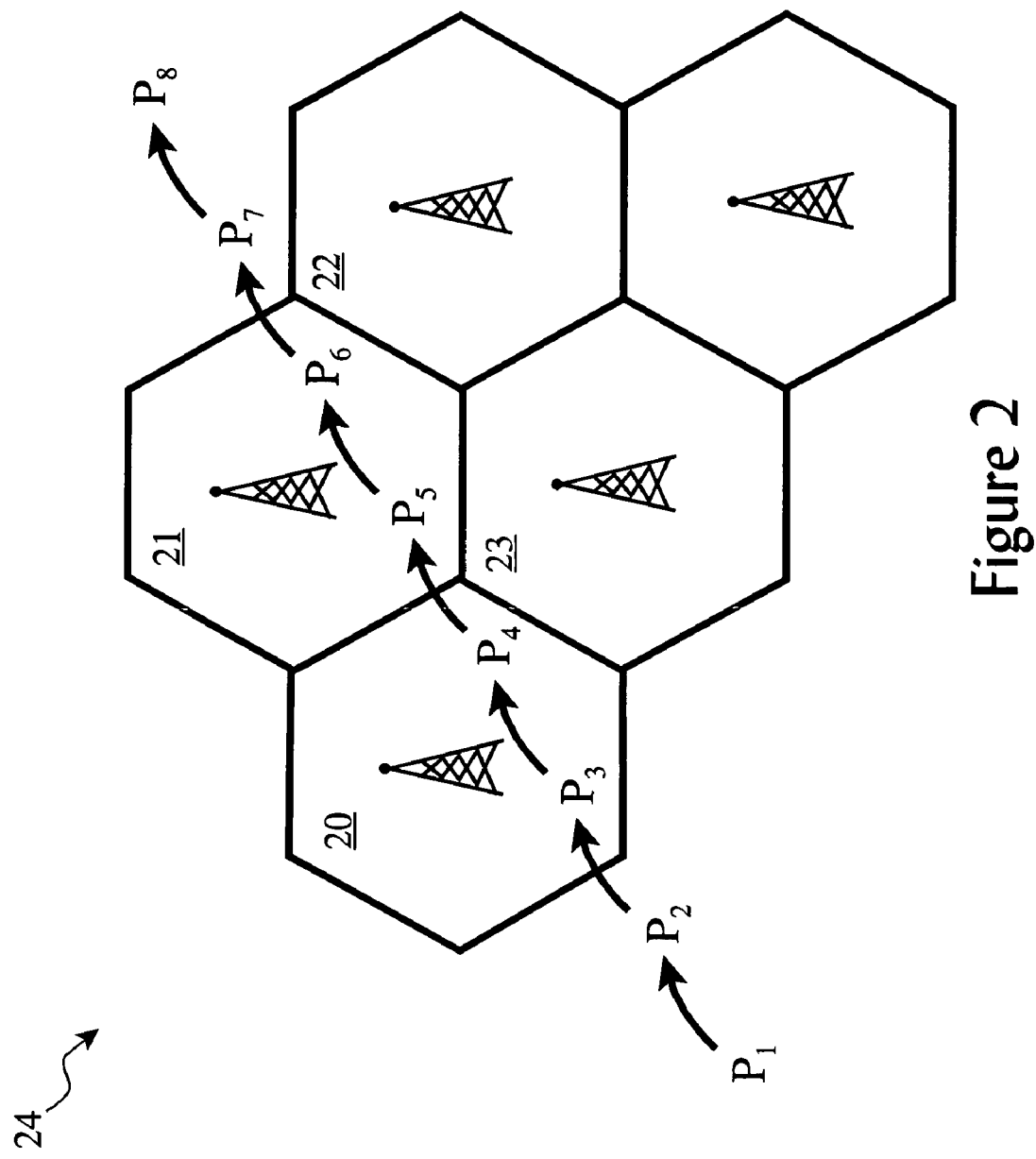
FIG. 2 illustrates a larger portion of a cellular network and how a terminal or handset may traverse multiple positions.
Figure 3:
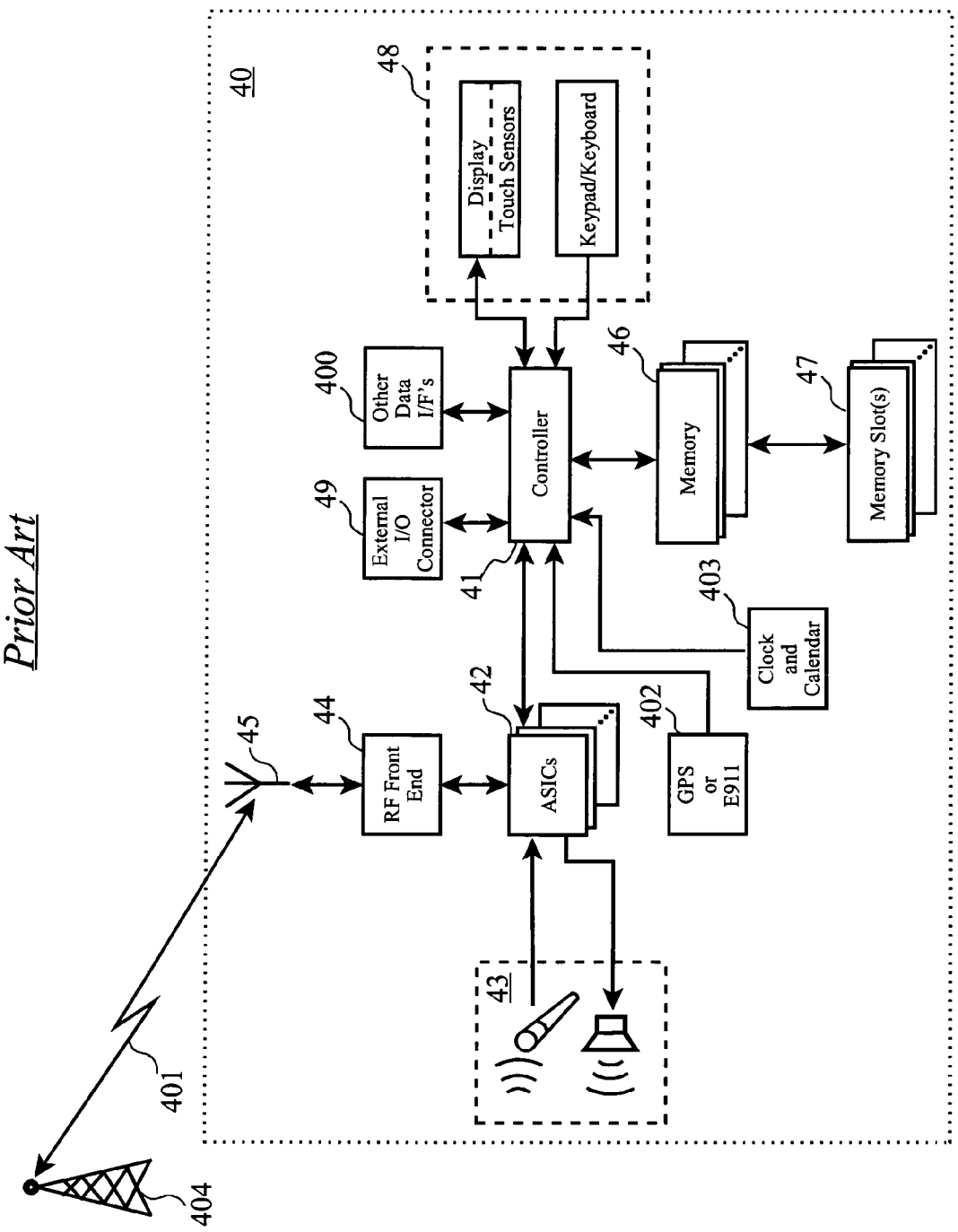
FIG. 3 shows a generalized architecture of cellular telephones and other wirelessly networked devices.
Figure 6:
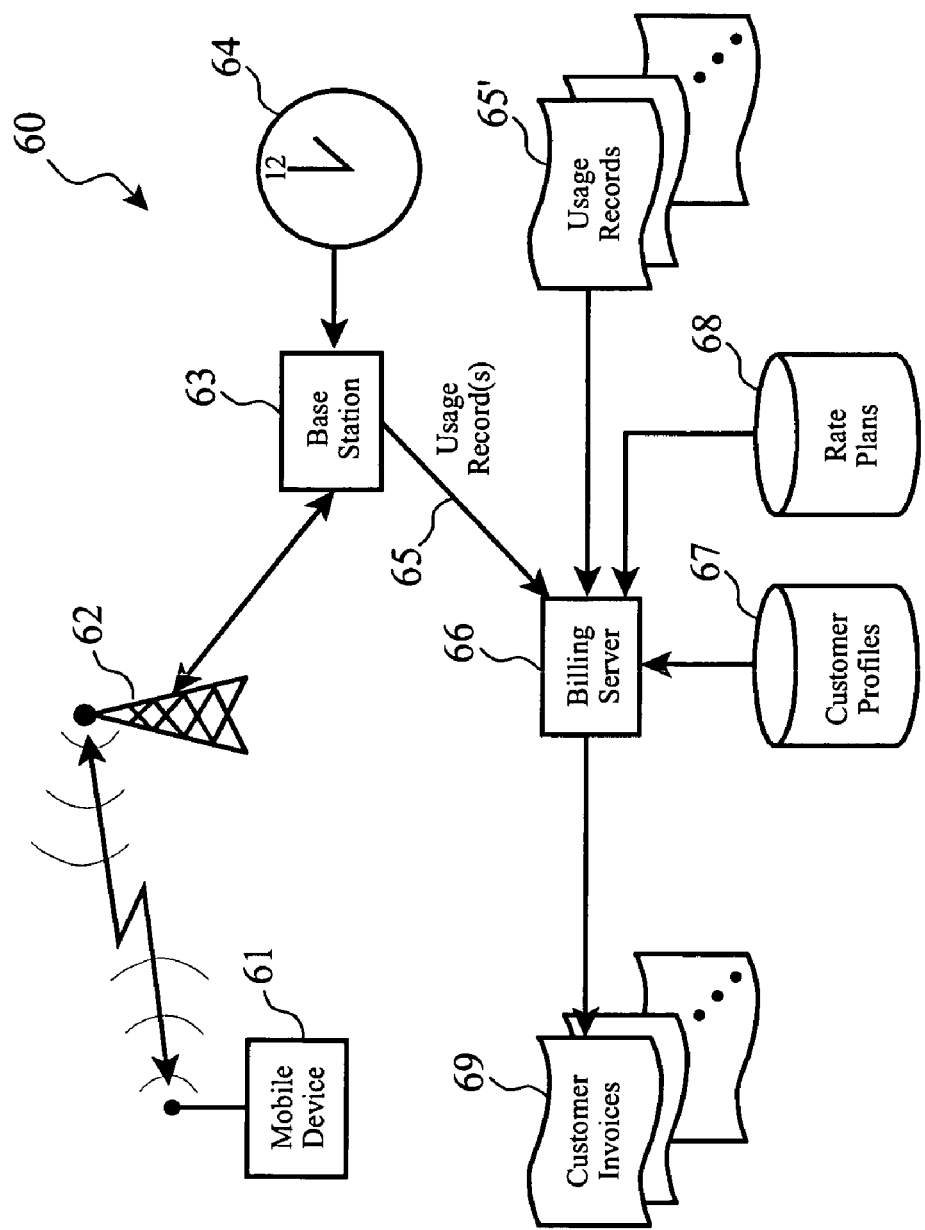
FIG. 6 illustrates the present-day billing reconciliation process.

In conjunction with the discount and incentives provided by the related invention, user's of mobile devices are allowed to establish a set of preferences under which certain activities on their mobile device can be completed while in a higher cost cell, but for which the actual network servicing of the operation is delayed until the mobile device reaches a lower cost cell where the incentives are being offered to the consumer.

By delaying service completion but allowing the user to perform certain actions in the higher cost cell, the user is able to queue certain services to occur while he or she is mindful of it, but the completion of which will be made in a lower cost cell, thereby providing maximum convenience and cost advantage to the user.

For example, when a user initiates editing of a text message on his or her cell phone, the cell phone may determine (or query the user) that the message is of a class "personal". According to a set of user preferences, personal messages are preferred to be delivered only in discounted cells. So, if the cell where the phone is currently located is offering a discount, the message would be sent immediately. But, if the phone is currently located in a full-price cell, the message would be stored by the phone, and transmission would be delayed until the phone is notified that it has reached a discounted cell.

According to one aspect of the invention, the user may designate a plurality of classes of services and actions, such as "personal", "business", "family", etc. Ordinary actions, such as text messaging, voice calls, web browsing, etc., can be determined to exist in one of the user's defined classes based upon address book entries, queries of the user, etc.

According to another aspect of the present invention, additional conditions may be defined by the user under which completion of queued services would be done besides reaching a discounted cell, such as upon a maximum delay time per action, reaching a certain time of day, receiving a power-off request by the user, low signal strength, or low battery power, etc.

DETAILED DESCRIPTION OF THE INVENTION

The present invention is preferably realized as circuitry or firmware stored in a wireless network device's memory (46) and executable by the device's controller (41), cooperating with logical processes provided by a server system operated by a wireless network service provider. The portion of the invention realized as executable by the wireless network device may be preprogrammed into the device, or it may be downloaded from a memory card, the wireless network or another data network or interface, as the capabilities of the device allow and within the business model of the service provider.

Throughout this disclosure, we will refer specifically to and provide examples of embodiments with respect to cellular telephone services. The present invention, however, is not limited to these embodiments, but may equally well be realized in conjunction with any wireless network services and systems wherein the service geography is served by a plurality of radio access points, such as wireless LAN access points, BlueTooth, etc. As such, when we refer to a cell phone or mobile device, we are referring in general to any such wirelessly networked device such as a PDA, cell phone, laptop computer, pager, etc. Additionally, when we refer to a "tower", we are referring to any wireless network access point, such as a LAN wireless access point, a Blue-Tooth transceiver, and a cellular telephone tower (analog or digital).

Additionally, the present invention is preferably realized in conjunction with the invention set forth in the related patent application, the disclosure of which is contained herein and which has been incorporated by reference. It will be recognized by those skilled in the art, however, that the present invention may be realized in alternative embodiments in conjunction with other network services and systems without departing from the scope of the invention.

Currently, network load smoothing is done using pricing based upon time of day embodied in a region-based rate plan. This entails offering users lower service pricing for weekends and after 7 PM where demands for cell phone usage is less, for example. Rate plans also offer pricing incentives for using the services within certain rate plan regions (e.g. home or local), and pricing premiums for using service in other regions (e.g. roaming).

These rate plan schemes provide no ability, however, for the providers to adjust pricing on a cell-by-cell basis within a rate plan region. As such, new towers, access points, etc., installed within a rate plan region generate the same review as existing towers within that region. Due to differences in cost of operating each tower, and/or due to loading variations among the towers within a rate plan region, some towers may actually generate negative revenue.

The present invention enables cell phone network providers to use pricing as a mechanism to enhance usage of specific cell phone towers within each rate plan region to provide further balancing of traffic among towers within a region, and to allow enhanced return-on-investment ("ROI") on underutilized towers.

Our invention extends upon the region-based rate plans to further allow dynamic variation in service pricing based upon the current utilization of cell towers. Rather than using the traditional area coverage rate plan, or in addition to a traditional area-based plan, a pricing policy is provided by the invention in which the users are shown, real-time, dynamically generated pricing and cost incentives to delay usage in high-traffic or high-cost-of-operation cells, and to encourage usage in low-traffic or low-cost-of-operation cells. Through usage of the invention over time, consumers may learn patterns of discounts and market incentives, and they will adjust their behavior accordingly, thereby affecting desirable traffic load changes among cells within a rate plan region without the need for publishing complicated maps, committing to contractual discounts, and educating the users with respect to technology complications and details. This allows cell phone carriers to make its services more attractive for users to defer using cell phones until a cell tower utilization is low, therefore lowering cost.

Figure 7:
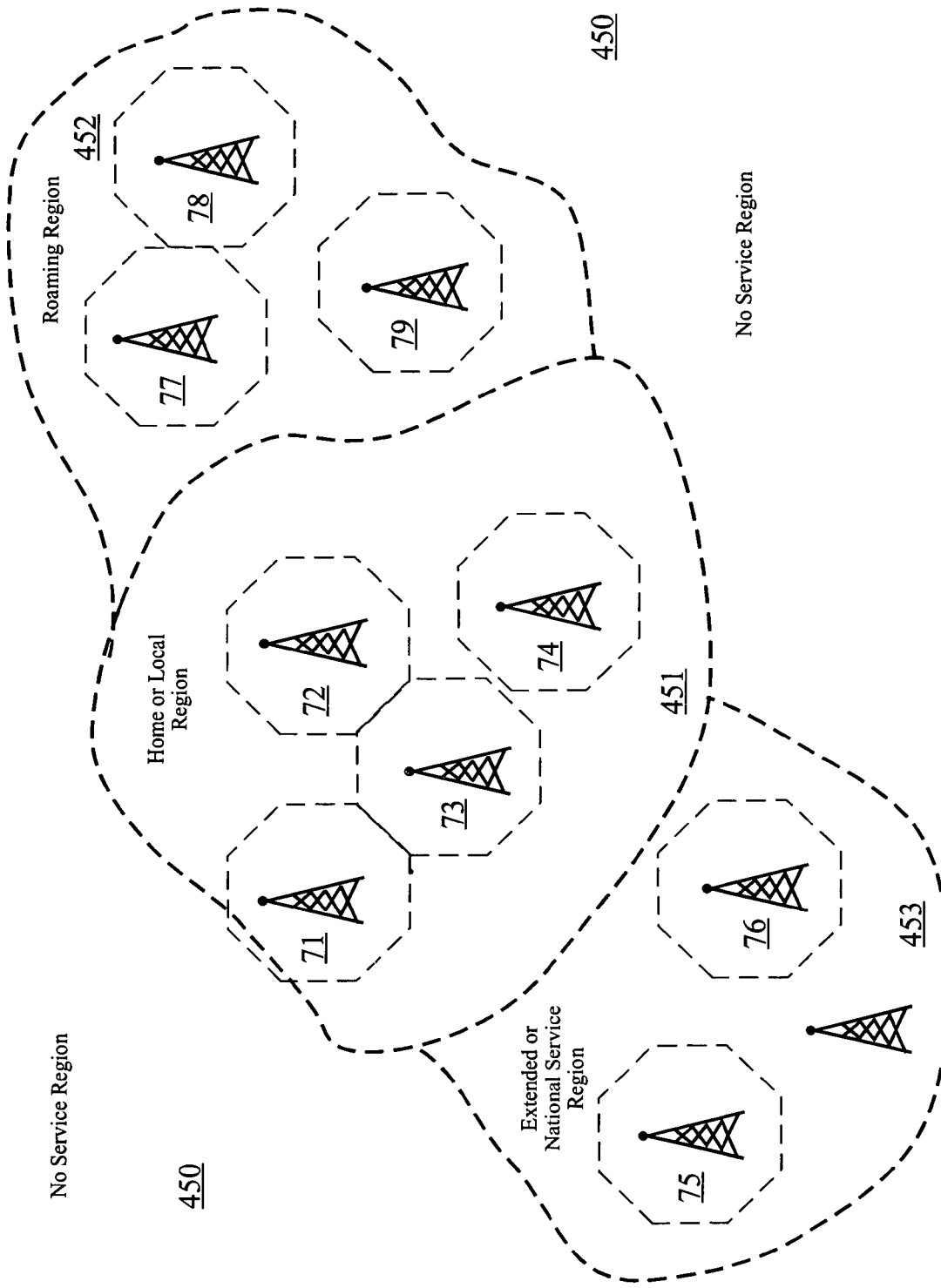
FIG. 7 depicts in more detail a number of service regions, each of which contain multiple cells, in which each cell generates the same revenue as the other cells within the same region.

Turning to FIG. 7, each rate plan region, such as a home or local region (451), contains a plurality of cells (71, 72, 73, 74) Each of the cell towers (71, 72, 73, 74) within the rate plan region have its varied utilization usage depending upon present and historical user traffic. This is also true in other rate: plan regions, such as roaming regions (452) and extended or national regions (453). It will be recognized by those skilled in the art that the pictorial of FIG. 7 is simplified for illustrative purposes, and in practice, each rate plan region comprises of multiple cell towers. It will also be recognized by those skilled in the art that there may be more than one of each type of rate plan region, and that other names or descriptions for rate plan regions may be adopted.

Now let's consider actual traffic or usage of tower's or cells within a region to illustrate the problem to which the invention is directed. For example, a particular cell phone tower that services users working in the vicinity of Times Square, New York City, is much more highly utilized than a cell tower covering a suburb at certain times, such as during the commuting hours to and from work (e.g. 7:00 am–9:00 am and 4:00 pm–7:00 pm). In fact, cell phone usage typically dramatically increases around the end of the work day period in downtown and urban areas, but then traffic on these same towers is relatively light during the weekends and evenings. At other times, though, certain cell towers in the suburban areas will be more heavily loaded than the downtown towers, such as during weekends or holidays when users are congregated closer to their homes.

Some wireless services consumed are "real time" services, such as the completion and connection of two-way voice calls. Some services, however, are one-way, such as the authoring of a Short Message Service ("SMS") text message or leaving of a voice message recording for a certain party. Traditionally, these one-way services are also conducted "real time" (e.g. the message is delivered at the same time the user creates it), even during the busiest periods of use of a particular cell tower.

All of these towers, downtown and suburban, though are located within the same rate plan region according to the typical rate plans offered by service providers today. So, usage of a cell phone during a commute when a tower is heavily loaded generates the same amount of revenue as usage of a cell phone in that same cell when tower traffic is lower, using the region rate plan scheme known in the art.

Consider a specific user, who we will call "user A", wireless service usage habits and patterns. When User A ends the work day, an SMS message is authored and transmitted to User B to confirm a dinner plan, for example. This message would be sent soon after leaving the workplace, perhaps on the sidewalk near Times Square while walking to the closest subway station. Alternatively, the user may leave a voicemail for User B, which according to the current technology would be transmitted over the telephone network immediately and stored at User B's voicemail box server.

Under the current pricing model, the message sent by User A (or minutes used to record and send a voicemail) will be charged based on the type of monthly plan purchased according to the "local" region rate. The tower serving this cell, though, is experiencing a very high load of traffic, as many other users are doing the same type of thing at the same time (e.g. they are all leaving work and making a personal call, sending a message, etc.). There is little or no incentive for each user to delay sending an SMS message at this time, say 5:15 p.m., because their "nighttime" minutes don't start until 7:00 p.m., or even 9:00 p.m., which would be too late for organizing dinner plans, for example.

Figure 8:
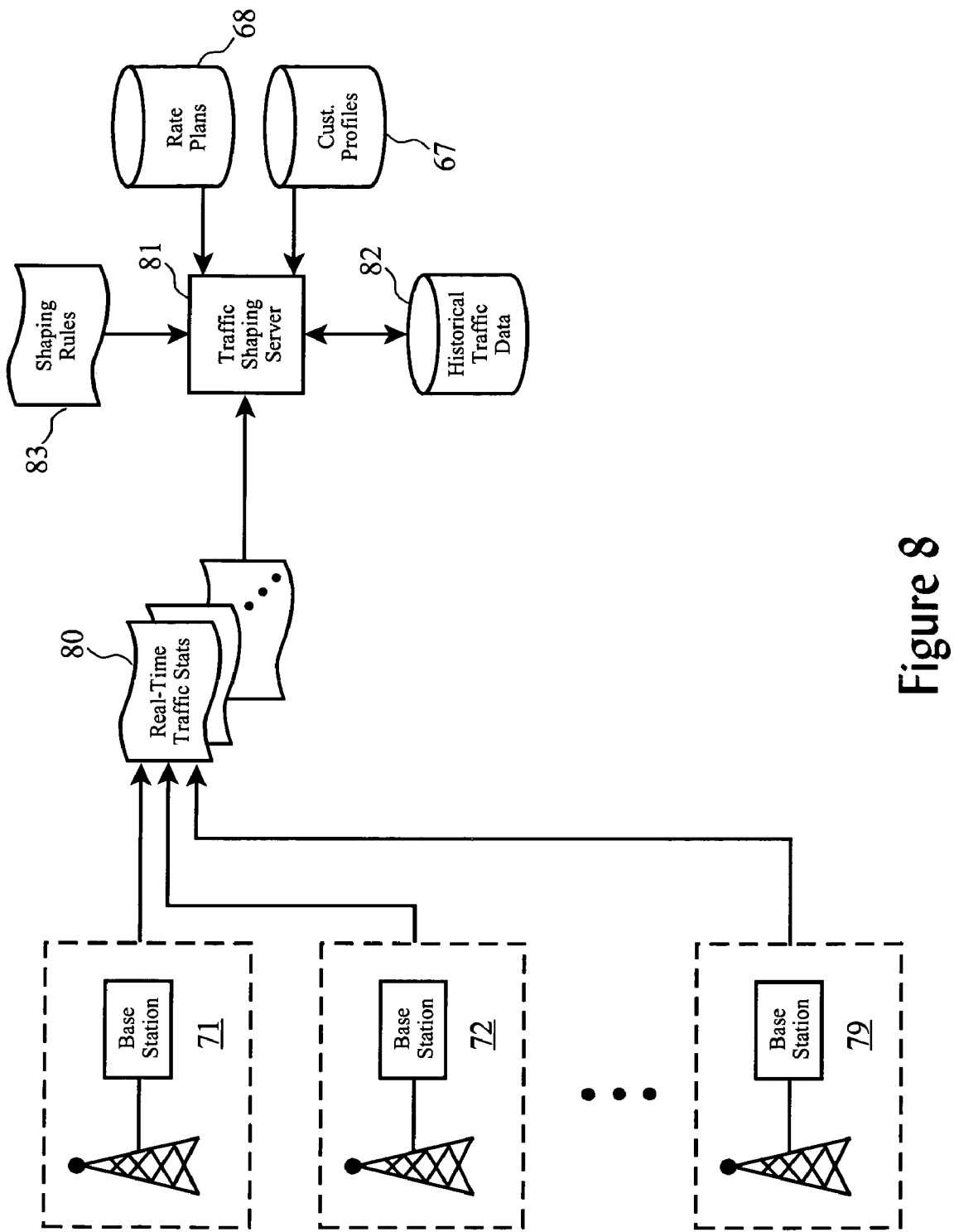
FIG. 8 illustrates a portion of the logical process of the present invention involving collecting real-time usage statistics.

Each tower tracks and maintains its traffic level which varies by components such as number of users servicing, number of calls or services consumed (e.g. calls, sessions, messages, etc.), and length of consumption (if relevant). According to one aspect of the present invention, these statistics and data are utilized as shown in FIG. 8 by collecting real-time usage information from the base stations. Each base station (71, 72, 79) provides real-time traffic and loading statistics (80) to a traffic shaping server (81). The traffic shaping server (81) receives this information in near real-time mode, and the traffic shaping server (81) has access to a set of behavior shaping rules (83), and optionally the user rate plans (68) and customer profiles (67).

Our shaping rules (83) of the related invention comprise discount policies that define market discounts to be offered to users in order to modify consumption behaviors and direct usage to underutilized or more cost-effective cells within the same rate plan region.

Additionally, using historical data (82) regarding each cell tower's historical usage, the potential utilization of each cell tower at a specific time period can be determined.

With this information, the shaping server (81) can determine when a service is being initiated by a user in a certain cell if that cell is currently highly utilized or loaded, and if so, if there is a nearby or adjacent cell which is relatively lowly utilized or historically underutilized. If so, the user can be provided a signal or indication that a discount would be available for using the service or making the call from an alternate cell, in order to encourage the user to delay service consumption, thereby alleviating the busy cell of the additional traffic. The process of signaling the user is described in more detail in the following paragraphs.

For example, at 5:00 p.m. on a weekday, the carrier can send a notification to User A that the current cell where the user is located is a full price cell. Later, when User A arrives in a lower cost cell (e.g. lower utilized cell), the carrier can send a notification to User A that a discount applies to making calls or using other services while in this cell. It is important to note that the two cells described here are both within the same rate plan region, and would not have been priced differently under the standard region-based rate plan of the prior art.

So, after this set of experiences are had by the user, the user will learn that by using the present invention, he or she may record a voice message or author a text message at any time (e.g. even when located in a full price cell), but the system can automatically delay the transmission of his or her text or voice message according to his or her discount preferences, the user's costs can be managed and minimized. The network operator also realizes an benefit as this change in their consumers' behavior distributes the load of messages to cell towers which are less in demand. In this example, if the user is leaving the office headed for a 20 minute subway ride to his or her neighborhood, the user notices that when leaving the office building, the rates are full price. But, when emerging from the train station in the neighborhood, there is a discount available. As such, the user will learn to take advantage of the discounts by configuring his or her preferences to delay the sending of non-urgent messages for a few minutes until he or she is in the lower cost cell. The user may author or record the message at any time, though, so that the user will not forget to create and send the message later, and so that the user's convenience is not negatively impacted.

Through this method, the related invention encourages user behavior changes without committing to a new rate plan, without publishing new rate plans, and can accommodate dynamic changes in the network loading conditions. For example, if in the future the cell in the neighborhood also becomes historical busy during the 5:00–6:00 p.m. range, the discount offer can be discontinued by simply not indicating a discount to the user.

Figure 9:
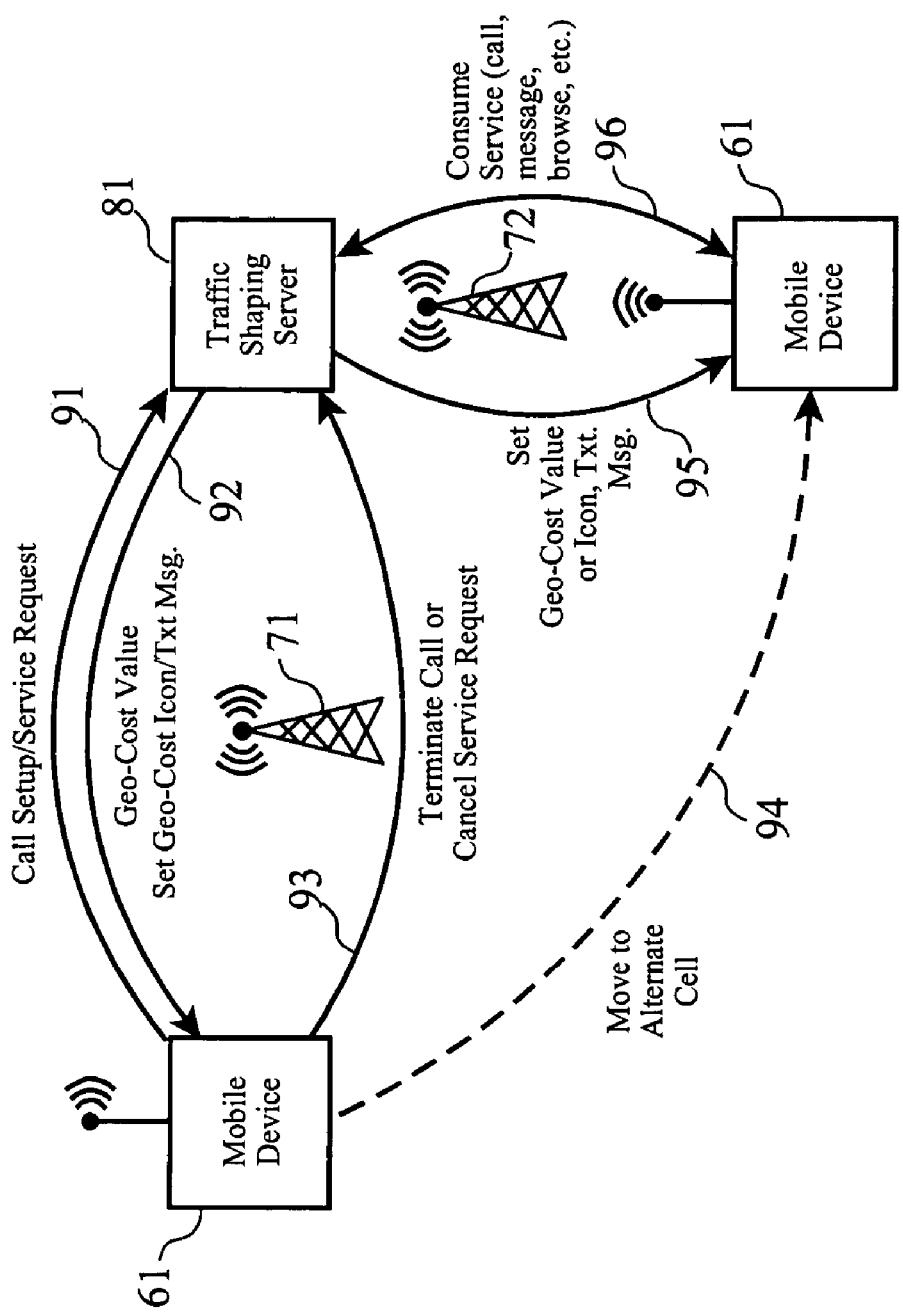
FIG. 9 shows user consumption behavior modified by service incentives according to the present invention.

The foregoing example is illustrated in a general sense in FIG. 9, which can be interpreted for any number of other sequences of actions of a user and the wireless network system. Rather than having User A author and transmit a message near Times Square using the user's mobile device (61) at a certain time, a message transmitted in the Bronx may be given a discount after the user moves (94) to a more underutilized cell. More specifically, the mobile device (61) within the first cell (71) initiates a call (91) or other service request (e.g. text message, web browsing, etc.), which is intercepted by our traffic shaping server (81).

The traffic shaping server (81) conducts a check on all the real-time statistics of the cell (71), and potentially of other cells within the same rate plan region, and sends a geographical cost ("geo-cost") value notification back to the mobile device (92). This notification can be any of several embodiments, including setting an icon on the mobile device's display, sending a text message to the mobile device, or providing a data value to the mobile device which is then used by a program on the mobile device to notify the user (e.g. the mobile device may receive a data value and then may display it, annunciate it using voice or tones, etc.). User A, knowing that discounts may be available in other cells, may decide to cancel the current call (93) or service request, and to make the call at a later time after relocating (94) to another cell (72). Likewise for text or voice messaging, the user may decide to author or record the message immediately, but to allow the mobile device to store the message for later delivery when located in a cell where a discount is offered.

When the mobile device (61) reaches the new cell tower coverage (72), if the cell where the mobile device is currently located is an underutilized or low-cost cell, the shaping server will determine this using the real-time traffic statistics, rate plans and shaping rules as previously described. Then, an updated geo-cost indicator is provided (95) to the mobile device which will alert the user to the fact that a discount currently applies to calls or services consumed from this cell. So, for example, once our hypothetical User A arrives in his or her neighborhood, perhaps the Bronx, the geo-cost indicator on the phone be updated to show a discount is in effect. This may result in the user deciding to initiate and consume (96) a service for the case of a telephone call. In the case of a stored message, the message will be automatically delivered, as described in the following paragraphs.

When this pattern is repeated a few times to the user, most users will learn that discounts are usually available at certain times on certain days in certain places (e.g. in certain cells). They will learn only the portions of the discount plan that apply to them, thereby minimizing the "learning curve" which would be otherwise required to understand a complicated table of rates, times, and a map of cells within a rate plan region. Additionally, as traffic is redirected historically to cells which are underutilized, the discounts offered can be lessened or even eliminated. Even when the discounts are eliminated, some consumers will continue their habit of placing calls in the lower cost cells.

Figure 10:
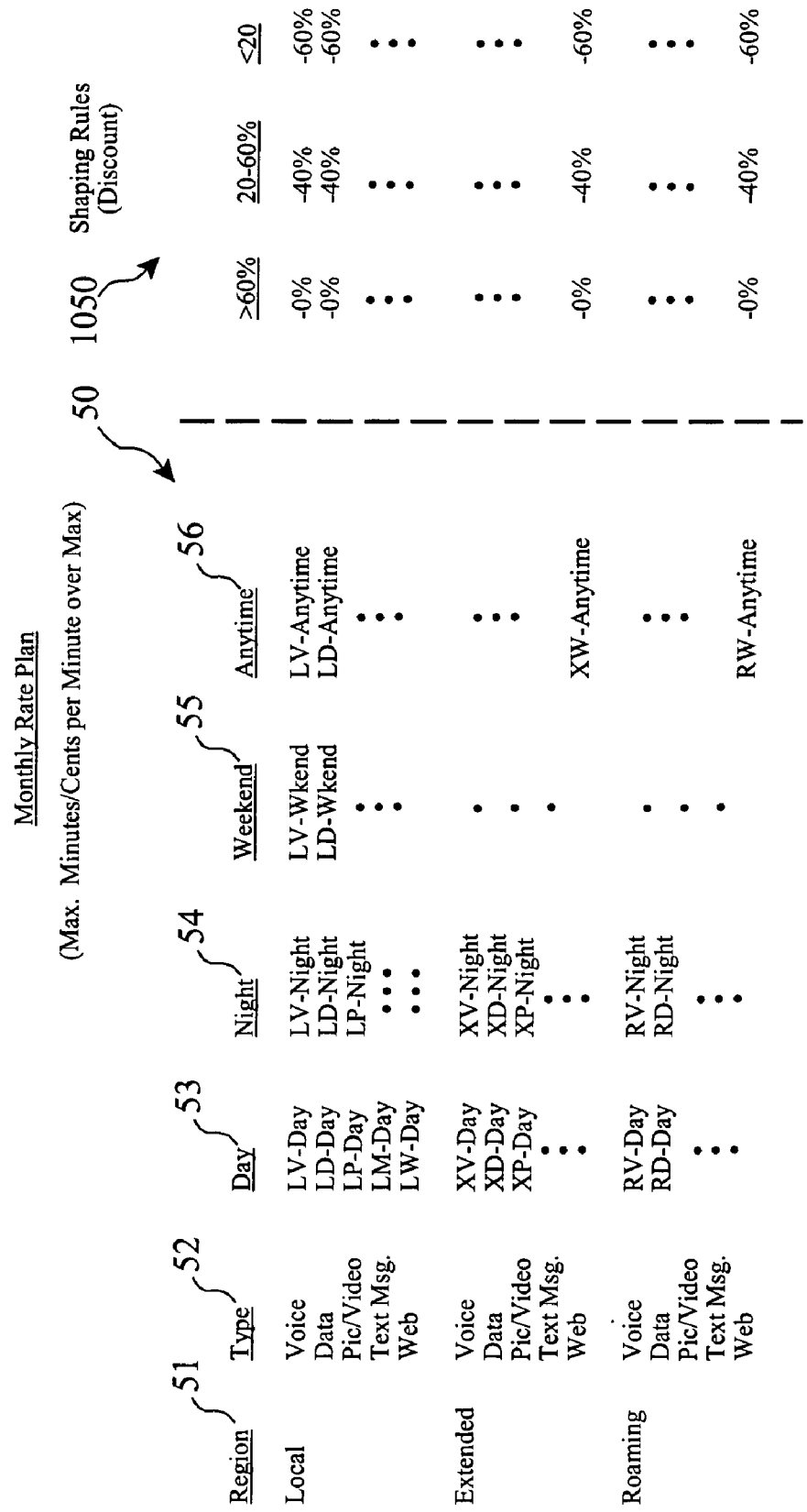
FIG. 10 shows usage shaping rate rules according to one aspect of the present invention, the Graduated/Stand-alone Discount Profile.

By offering incentives to consumers in this manner, one embodiment of an incentive pricing model (1050) according to the invention can be realized in our shaping rules as shown in FIG. 10. Cell phone network providers can offer discounts based on percentage of tower utilization in this model. For example, if a cell tower is more than 60% occupied at a certain time, then no discounts are available. However, if the tower traffic is between 20% and 60% utilized, then a 40% discount can be applied to calls made from that cell at that time. These discounts can be applied to the standard or "full" rates for that rate plan region and period of time. For example, if the user is within a 50% utilized cell in an extended rate plan region at night and is attempting to send a text message, the "full" rate of XM-Night is reduced by 50%. For cells with even greater underutilization, such as less that 20% utilization in this example, even greater discounts (e.g. −60%) can be offered. This pricing strategy promotes usage awareness and encourages change in user consumption behavior—the greater the discounts offered, the greater the incentive to change usage patterns, and the greater the return to the service provider. Of course, our example here uses three tiers of cell tower utilization, which could be expanded to any number of tiers (from 2 to many). Likewise, different discount rates can be defined for different types (52) of service even though we have shown for simplicity similar discount rates among different types of service.

Figure 11:
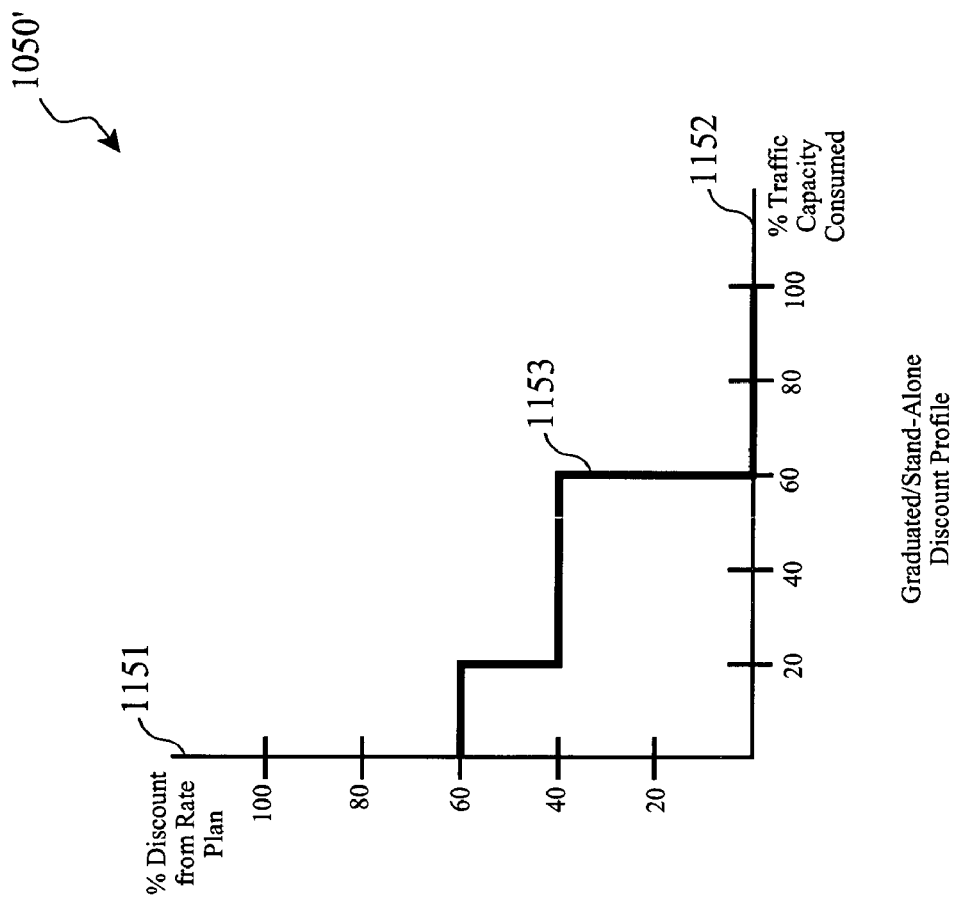
FIG. 11 depicts our Graduated/Stand-alone Discount Profile in graphical format.

The shaping rules described in the foregoing paragraphs and shown in FIG. 10 are our Graduated/Stand-Alone ("GSA") pricing policy, which is shown graphically in FIG. 11. The amount of discount (1151) from standard or full rate is a stepwise function (1153) of the traffic loading (1152) of a particular cell at a given time and/or historically.

Turning to FIG. 12, an alternate set of shaping rules (1050'), which we refer to as a Graduated/Comparative ("GC") discount policy, is illustrated in correlation to a standard region-based rate plan (50). Rather than providing discount thresholds which are a function solely on traffic conditions within the cell where the mobile device is currently located, the GC policy produces discounts as a function of relative traffic conditions between the current cell where the user is located and adjacent cells (e.g. cells where the user is most likely to travel soon). This is provided in this example policy by taking a ratio of an adjacent cell's utilization compared to the current cell's utilization, and then what percentage discount is due. For example, if the adjacent cell is less utilized (e.g. ratio is less than 1.0) up to 20% more utilized than the current cell, no discount would be offered (e.g. the neighboring cell is similarly loaded). However, if the neighboring cell is particularly more loaded than the current cell (e.g. the ratio is 1.2–1.6), then a discount, perhaps 40%, would be offered to encourage the user to use a service now in the current cell (rather than potentially waiting and using the service when located in the higher utilized cell). Likewise, the adjacent cell is greatly much more utilized than the current cell (e.g. ratio is greater than 1.6), and even greater discount or incentive is offered to the user to encourage using the service in the current cell.

Figure 13:
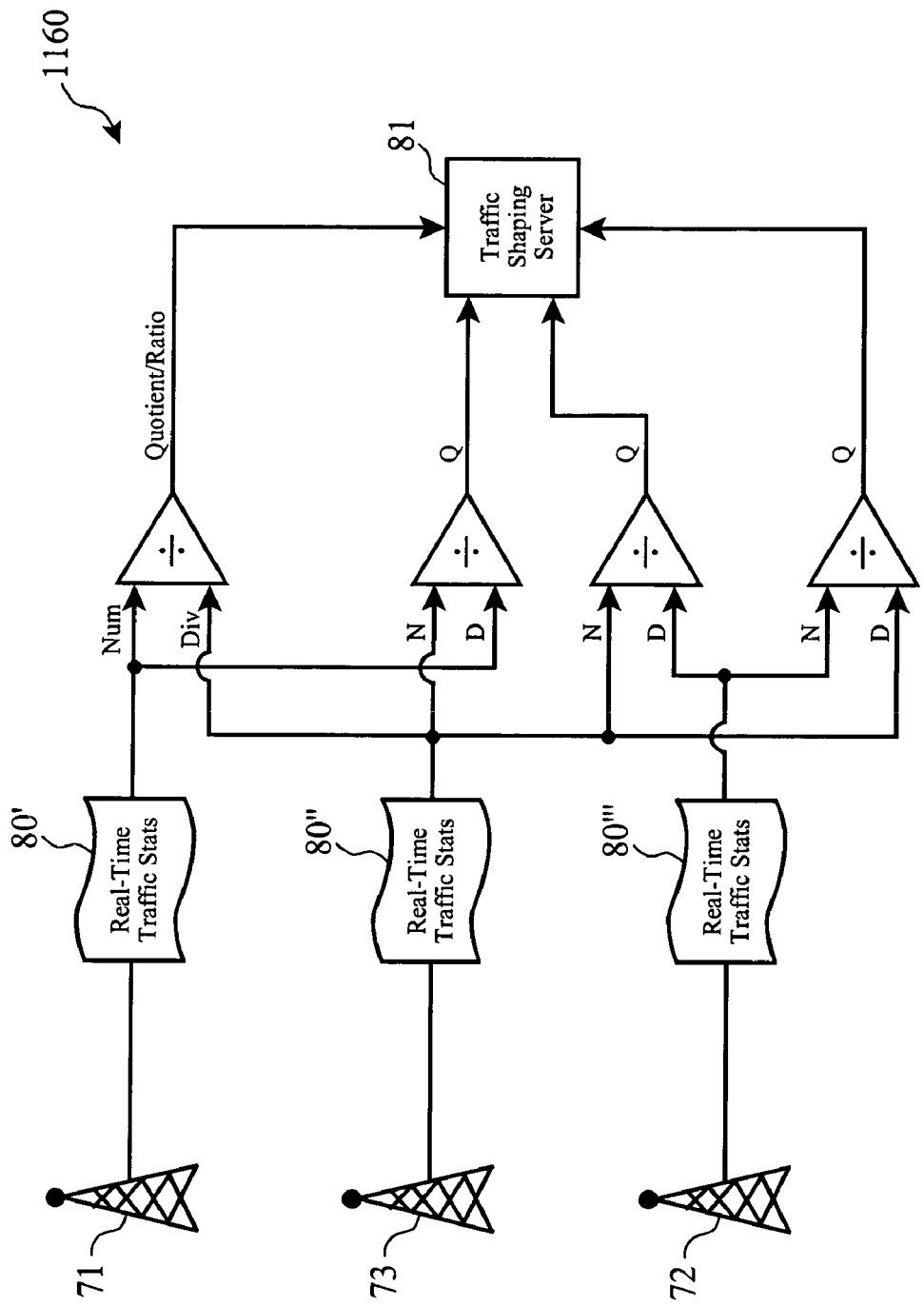
FIG. 13 illustrates a portion of the logic of the present invention according to the Graduated/Comparative Discount Profile aspect.

FIG. 13 illustrates the logic of comparing utilization statistics (80', 80''') of adjacent cells (71, 72) to a current cell (73) utilization statistics (80'') using ratio calculators (1161), the results of which can be considered by the shaping server (81).

As mentioned previously, discount notifications are sent to mobile devices when it becomes available. These geo-cost notifications can display in various forms such as icons, text messages, or value. However, it will be recognized by those skilled in the art that the present invention is not limited to the following display formats, but may be alternatively realized.

For example, a text message reading as follows could be sent to the mobile device when a discount is being offered in a particular cell:

"Cool!! Make a call now and save an extra 20%!

Thanks for Using MegaServe Wireless today!"

Figure 14:
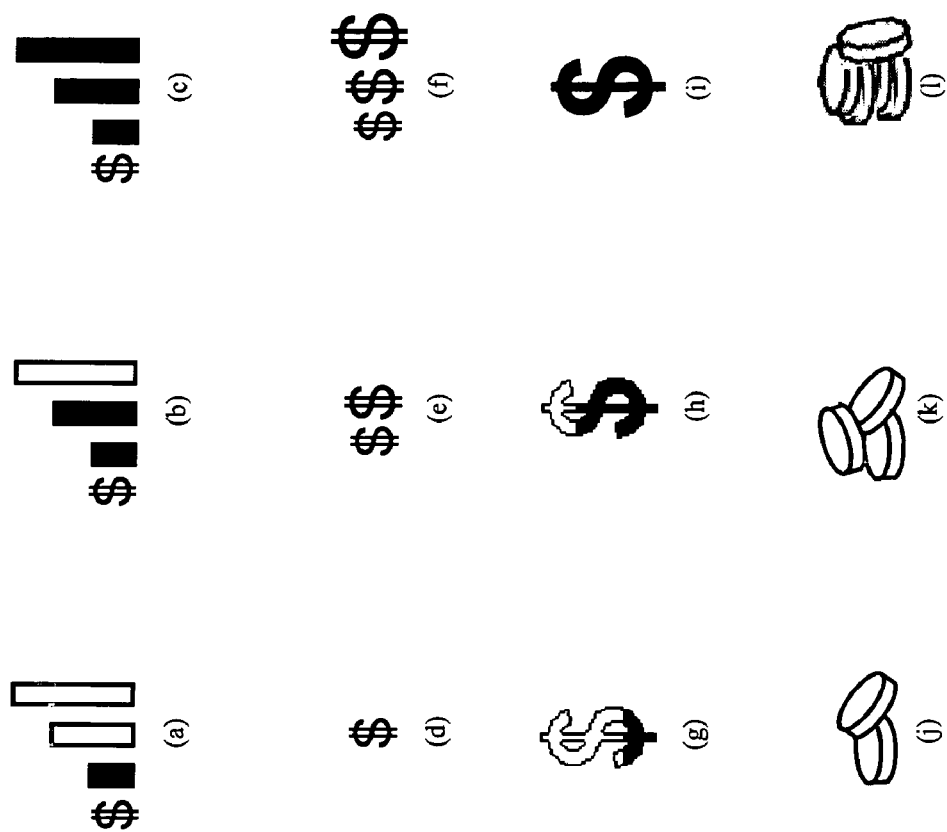
FIG. 14 depicts several optional embodiments of a geo-cost notifications icon for display on a cellular telephone, PDA, or other mobile device's user interface.

Alternatively, a geo-cost icon or indicator can be displayed on the mobile device's user interface, such as those shown in FIG. 14. For example, to notify users the costs of each call, message, or other unit of consumption of service, a cost meter can be used to show gradual increasing costs one bar (a) for highly discounted, to two bars (b) with some discount, to full or standard rate (c).

Following a similar scheme, alternate iconic representations can be dollar signs of graduated size from greatest discount to standard rate (d, e, f respectively), a partially filled dollar sign (g, h, i), or stacks of coins (j, k, l).

Any of these icons can be filled with numerous colors to denote changes or value, such as using green for greatest discount and red for standard rate. Also, the use of any other graphic symbol which readily conveys the meaning of cost or money can be used in place of the dollar symbols, especially for systems designed for use in cultures which use other monetary symbols such as the British pound £, the European Union's Euro €, or the Japanese Yen ¥.

According to another embodiment of the related invention, a downloaded JAVA applet executed by the mobile device can receive a data value from the shaping server, and then can determine how to notify the user of the discount opportunities using icons, images, and/or sounds.

Figure 15:
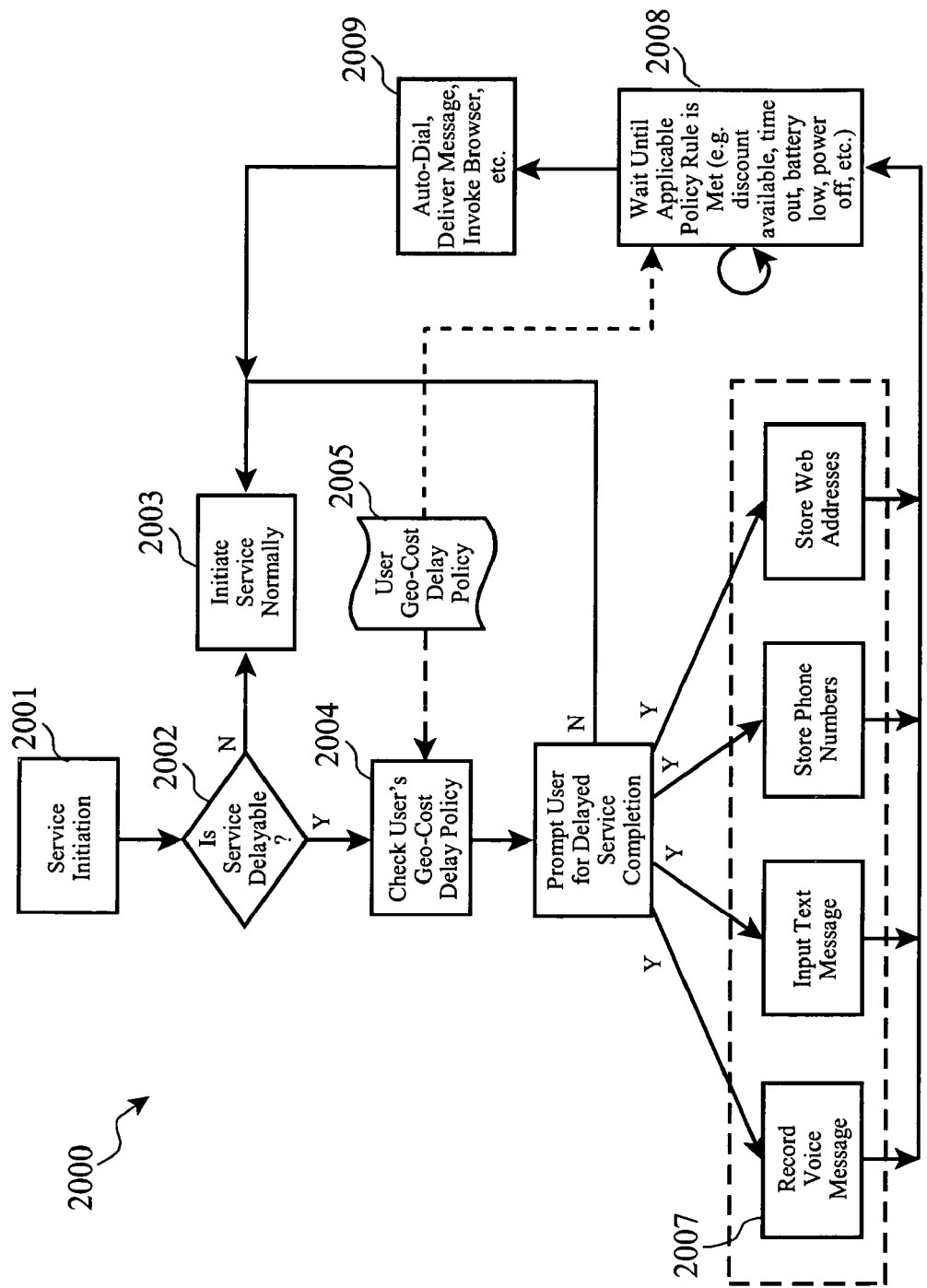
FIG. 15 shows the logical processes of the present invention which defers service completion based upon geographical-based pricing advantages and user preferences.

Authorizing Messages Real-Time and Delaying Message Completion According to Cost Incentives and Preferences Turning now to FIG. 15, our method (2000) of the present invention is shown which allows realtime or immediate authoring or recording of messages, and automatically defers or delays service completion (e.g. message transmission) based upon geographical-based pricing advantages and user preferences. Services which are one-way in nature, such as authoring and sending a text message, capturing and sending a picture or video, or recording and delivering a voice message, are handled differently from the technology currently available in that they are not created and completed at the same time. In other words, the creation of the information to be delivered and delivery of that information are separated in time as such:

(a) user creates information to be sent (e.g. authors a text message, captures a picture or video, records a voice message) at any time, and immediately to the user's need to create a message, regardless of the current pricing of the cell where the mobile device is located;

(b) if user's cost incentive preferences are not currently met in the current cell, the information (e.g. voice recording, text message, etc.) is stored in the user's mobile device and is not delivered or transmitted, thereby avoiding any network usage at the current cost or pricing level;

(c) a delay period is incurred according to the user's preferences by the invention embodied in the mobile device; and (d) upon completion of the delay period (or upon the meeting of an alternate preference setting), the stored information is delivered (e.g. the text message is transmitted, the picture or video is transmitted, the recorded voice message is delivered to the addressee's voicemail box, etc.).

Normally, step (d) above is completed in a cell which is offering a cost incentive, which allows the user to obtain savings for certain types of service, and defers the network traffic caused by those delayed services to another cell tower which is not as busy, less expensive to operate, etc. Alternate preferences for completing a deferred service can be defined as well, such as completing all deferred messages when a battery is detected as low, or when the power to the mobile device is being turned off by the user, as will be described in more detail in the following paragraphs.

Using our hypothetical User A who authors a text message (or records a voice message, etc.) addressed to User B, a wireless service is initiated (2001). The mobile device (e.g. cell phone, PDA, etc.) determines (2002) if the initiated service is a type for which service completely can be delayed (e.g. a text message, voice message, web connection, etc.). If it is not of a type which can be delayed, then the handling of the service proceeds normally (2003). Optionally, the user is provided a control or prompt which allows the user to override any delays of service completion, which provides an ability to selectively complete service normally (2003) under user control, e.g. a text message is sent immediately to User B while charges are recorded based on User A's regular pricing plan.

Otherwise, if (2003) the service can be delayed, then the system performs (2004) a check of the user's geo-cost delay policy (2005). An user's geo-cost delay policy is preferably a file or data structure stored in the mobile device, but may optionally be a data structure or query available to the mobile device from a network server. It comprises a set of rules and policies that dictate when services can be completed according to a classification of the attempted service and the current pricing incentives being offered in the cell where the mobile device is currently located.

For example, Table 1 shows an example Geo-Cost Delay Policy.

TABLE 1

Example User Geo-Cost Delay Policy

In (plan-area=home), for:
    text_messages:
        queue if rate not discounted;
        auto-transmit if rate discounted or
            queued 1 hour or battery is low
            or if power-off button;
        receive always;
    voice_messaging:
        auto-dial business always;
        queue personal if rate not discounted;
        auto-dial personal if rate is discounted or
            time is after 10:00 pm or
            if battery is low or if day is weekend;
        receive all always
    web_browser:
        auto-connect business and investment always;
        queue personal if rate not discounted;
        auto-connect personal if rate discounted;
In (plan-area=roam), for:
    text_messages:
        queue if rate not discounted;
        auto-transmit if rate discounted or
            queued 1 hour or battery is low
            or if power-off button;
        receive if rate discount;
    voice_calls:
        auto-dial business after prompt;
        queue personal if rate not discounted;
        auto-dial personal after prompt;
        receive all after prompt;
    web_browser:
        auto-connect after prompt;

This example geo-cost policy defines two sets of rules or preferences, a first set for services made from the "home" rate plan region, and a second set for services attempted from a "roaming" rate plan region. Additionally, it defines three classes of services (a) business, (b) personal, and (c) investment. These same classes are preferably stored in an address book in association with each entry (e.g. denoting each telephone number, pager number, buddy name, web address, etc., as personal, business or investment). Optionally, the user may be prompted to select a class of service upon initiation of the service, especially when located in a full-rate cell.

According to this example set of rules, when the user is located in a home region, text messages will be queued if rate not currently discounted from standard "home" rate, and the stored and queued messages will be automatically transmitted from the mobile device through the network when the mobile device is relocated to a cell where the rate is discounted. Additionally, the messages stored by the mobile device may be automatically transmitted after they have been delayed for 1 hour, or when the mobile device's battery is low or when the user presses the power-off button. Text messages of all classes are handled the same way, according to this set of rules.

Voice calls initiated from a home region are handled differently depending on the availability of discounts, and the class of the service. For example, business calls will always be connected and completed without delay, but personal calls are queued if the rate is not discounted (e.g. a voice message is recorded into the mobile device's memory and stored for later delivery to the intended recipient). When queued, the telephone number and voice recording is stored in memory, and then automatically dialed (e.g. auto-connected) and delivered (e.g. played), or transmitted to the recipient's voicemail box, when the mobile device reaches a cell where a discount is offered. As in this example, if the current time is after 10:00 p.m., the battery is low, or when the day is a weekend day, the recorded voice message would automatically be delivered. Additionally, inbound calls are always received, regardless of service class.

Similarly, web browsing attempts (e.g. attempt to connect or view a web page) while in a home region are allowed without delay for business and investment web sites and addresses, but are queued for personal web sites and pages if the mobile device is not currently located in a cell where a discount is being offered. Personal web sites are auto-connected (e.g. automatically downloaded or refreshed in memory) when the mobile device reaches a discounted cell, without exception to battery power, time, etc., according to this example.

Likewise, similar rules are established for services initiated from a "roam" rate plan region, except that most of the rules provide for prompting of the user to either complete immediately or queue the service.

By providing such a user-configurable set of rules, this provides the user with the option to have messages and other services deferred until being automatically completed when his or her preferences are met. This allows users to take advantage of the pricing discounts based on tower traffic, but does not require the user to remember to repeat the service initiation when the lower cost cell is reached (e.g. avoids the user forgetting to send that message later when a discount is offered).

Once the system conducts the geo-cost delay policy (2005) checks (2004), it preferably prompts (2006) the user to decide whether or not to queue (2007) the service completion after waiting (2008) to reach a discounted cell, or until another logical condition is met (e.g. power-off, battery low, etc.). If the user wants the message to be sent instantly, then service will be initiated and completed normally (2003), according to the preferred embodiment. If the service completion is queued and after the conditions set forth in the delay policy are met, the service is automatically initiated (2009) using the stored telephone number, address, etc.

According to other aspects of the present invention, the user may establish his or her geo-cost delay policy by using the user interface of the mobile device to directly edit and configure his or her preferences, or he or she may be provided with a web page or portal which allows the user to edit the policy which would then be downloaded to the mobile device.

In another optional embodiment, the policy is not stored by the mobile device, but is stored by a network server, and is made available to the mobile device through a specific query action.

As mentioned in the preceding paragraphs, the user is preferably allowed to define his or her own classes of services, such as business, personal, investment, news, sports, family, weather, etc., without limit as to number of classes. In an alternative embodiment, the user may be provided with or limited to pre-determined classes, and may be provided with a pre-configured policy which the user may or may not be allowed to change.

CONCLUSION

The present invention has been described in general terms and by use of illustrative embodiment examples. It is within the skill of those in the art to make certain alterations modifications, such as programming language, computing platforms, implementation methodology, in order to realize an alternative embodiment of the invention for use with an alternative system. Therefore, the scope of the present invention should be determined by the following claims.

What is claimed is:

1. A system for shaping of traffic and utilization patterns among a plurality of cells within a rate plan region, said rate plan defining at least one standard charge rate of service consumption for services consumed within a rate plan region, said system comprising:
   a discount indicator disposed in a mobile communications device, said indicator being set by a wireless service provider for a given cell in which said mobile device is presently located, said indicator indicating a discount value available for consuming wireless service from said given cell in order to encourage said service consumption;
   a geo-cost policy associated with said mobile device, said policy defining a set of rules and conditions according to said discount value and according to one or more classes of service under which service initiation is to be delayed and queued, and according to discount values offered in each cell of said rate plan region;
   a service completer which queues services by receiving information from a user of said mobile device, storing said information in said mobile device without use of network communications, and which automatically completes queued services upon present conditions meeting said geo-cost policy rules by delivering said stored information using network communications thereby delaying the use of network communications until geo-cost policy conditions are met.

2. The system as set forth in claim 1 wherein said service completer is configured to queue and automatically complete a wireless service selected from the group of sending a text message, receiving a text message, sending a voice message, receiving a voice message, sending picture, and receiving a picture.

3. The system as set forth in claim 1 wherein said service completer is configured to queue and automatically dial telephone numbers.

4. The system as set forth in claim 1 wherein said service completer is configured to queue and automatically complete a wireless service selected from the group of automatically connecting to a web address, automatically downloading a data structure, and refreshing a stored web page from a source web page.

5. The system as set forth in claim 1 wherein said discount indicator comprises a selection from the group of a user icon, a text message, and a computer-readable data value.

6. The system as set forth in claim 1 wherein said geo-cost policy comprises service classes based upon a selection from the group of telephone number, buddy name, web address, and keyword.

7. The system as set forth in claim 1 wherein said service completer is configured to automatically complete a queued service according to one or more geo-cost conditions selected from the group of currently offered discount value for a given cell, a mobile device battery low indicator, a mobile device power-off request, a clock time, a calendar day, and a mobile device low wireless signal strength indicator.

8. The system as set forth in claim 1 further comprising a geo-cost policy editor configured to edit said geo-cost policy.

9. A method for shaping of traffic and utilization patterns among a plurality of cells within a rate plan region, said rate plan defining at least one standard charge rate of service consumption for services consumed within a rate plan region, said system comprising:
- disposing a discount indicator in a mobile communications device, said indicator being set by a wireless service provider for a given cell in which said mobile device is presently located, said indicator indicating a discount value available for consuming wireless service from said given cell in order to encourage said service consumption;
- accessing a geo-cost policy associated with said mobile device, said policy defining a set of rules and conditions according to said discount value and according to one or more classes of service under which service initiation is to be delayed and queued, and according to discount values offered in each cell of said rate plan region;
- queuing mobile services by receiving information from a user of said mobile device, and storing said information in said mobile device without use of network communications; and
- automatically completing queued services upon present conditions meeting said geo-cost policy rules by delivering said stored information using network communications thereby delaying the use of network communications until geo-cost policy conditions are met.

10. The method as set forth in claim 9 wherein said steps of queuing and completing a mobile service comprises queuing and automatically completing a wireless service selected from the group of sending a text message, receiving a text message, sending a voice message, receiving a voice message, sending picture, and receiving a picture.

11. The method as set forth in claim 9 wherein said steps of queuing and completing a mobile service comprises automatically dialing a telephone number.

12. The method as set forth in claim 9 wherein said steps of queuing and completing a mobile service comprises queuing and automatically completing a wireless service selected from the group of automatically connecting to a web address, automatically downloading a data structure, and refreshing a stored web page from a source web page.

13. The method as set forth in claim 9 wherein said step of disposing a discount indicator comprises disposing an indicator selected from the group of a user icon, a text message, and a computer-readable data value.

14. The method as set forth in claim 9 wherein said step of accessing a geo-cost policy comprises evaluating service classes based upon a selection from the group of telephone number, buddy name, web address, and keyword.

15. The method as set forth in claim 9 wherein said steps of queuing and completing a mobile service comprises automatically completing a queued service according to one or more geo-cost conditions selected from the group of currently offered discount value for a given cell, a mobile device battery low indicator, a mobile device power-off request, a clock time, a calendar day, and a mobile device low wireless signal strength indicator.

16. The method as set forth in claim 9 further comprising providing a geo-cost policy editor configured to edit said geo-cost policy.

17. A computer readable medium encoded with software for shaping of traffic and utilization patterns among a plurality of cells within a rate plan region, said rate plan defining at least one standard charge rate of service consumption for services consumed within a rate plan region, said software being executed by a mobile communications device and performing the steps of:
- providing to a user of said mobile communications device a discount indicator, said indicator being set by a wireless service provider for a given cell in which said mobile device is presently located, said indicator indicating a discount value available for consuming wireless service from said given cell in order to encourage said service consumption;
- accessing a geo-cost policy associated with said mobile device, said policy defining a set of rules and conditions according to said discount value and according to one or more classes of service under which service initiation is to be delayed and queued, and according to discount values offered in each cell of said rate plan region;
- queuing mobile services by receiving information from a user of said mobile device, and storing said information in said mobile device without use of network communications; and
- automatically completing queued services upon present conditions meeting said geo-cost policy rules by delivering said stored information using network communications thereby delaying the use of network communications until geo-cost policy conditions are met.

18. The computer readable medium as set forth in claim 17 wherein said software for queuing and completing a mobile service comprises software for queuing and automatically completing a wireless service selected from the group of sending a text message, receiving a text message, sending a voice message, receiving a voice message, sending picture, and receiving a picture.

19. The computer readable medium as set forth in claim 17 wherein said software for queuing and completing a mobile service comprises software for automatically dialing a telephone number.

20. The computer readable medium as set forth in claim 17 wherein said software for queuing and completing a mobile service comprises software for queuing and automatically completing a wireless service selected from the group of automatically connecting to a web address, automatically downloading a data structure, and refreshing a stored web page from a source web page.

21. The computer readable medium as set forth in claim 17 wherein said software for providing a discount indicator comprises software for providing an indicator selected from the group of a user icon, a text message, and a computer-readable data value.

22. The computer readable medium as set forth in claim 17 wherein said software for accessing a geo-cost policy comprises software for evaluating service classes based upon a selection from the group of telephone number, buddy name, web address, and keyword.

23. The computer readable medium as set forth in claim 17 wherein said software for queuing and completing a mobile service comprises software for automatically completing a queued service according to one or more geo-cost conditions selected from the group of currently offered discount value for a given cell, a mobile device battery low indicator, a mobile device power-off request, a clock time, a calendar day, and a mobile device low wireless signal strength indicator.

24. The computer readable medium as set forth in claim 17 further comprising software for editing said geo-cost policy.

* * * * *